US009206842B2

(12) United States Patent
Dassanayake

(10) Patent No.: US 9,206,842 B2
(45) Date of Patent: Dec. 8, 2015

(54) CROSSED ROLLER BEARING

(71) Applicant: SANKYO SEISAKUSHO CO., Tokyo (JP)

(72) Inventor: Muditha Dassanayake, Kikugawa (JP)

(*) Notice: Subject to any disclaimer, the term of this patent is extended or adjusted under 35 U.S.C. 154(b) by 0 days.

(21) Appl. No.: 14/359,379

(22) PCT Filed: Nov. 28, 2012

(86) PCT No.: PCT/JP2012/080747
§ 371 (c)(1),
(2) Date: May 20, 2014

(87) PCT Pub. No.: WO2013/081008
PCT Pub. Date: Jun. 6, 2013

(65) Prior Publication Data
US 2014/0321783 A1 Oct. 30, 2014

(30) Foreign Application Priority Data
Dec. 2, 2011 (JP) .................................. 2011-264795

(51) Int. Cl.
*F16C 19/40* (2006.01)
*F16C 19/36* (2006.01)
(Continued)

(52) U.S. Cl.
CPC ............... *F16C 19/362* (2013.01); *F16C 33/37* (2013.01); *F16C 33/6629* (2013.01); *F16C 33/6614* (2013.01)

(58) Field of Classification Search
CPC .... F16C 19/362; F16C 33/37; F16C 33/6629; F16C 33/6614
See application file for complete search history.

(56) References Cited

U.S. PATENT DOCUMENTS 3,517,975 A * 6/1970 Davidson et al. .............. 384/619
4,687,345 A * 8/1987 Geka ................................ 384/44
(Continued)

FOREIGN PATENT DOCUMENTS

JP S60-133220 U 9/1985
JP H1-156314 U 10/1989
(Continued)

OTHER PUBLICATIONS

International Search Report (English and Japanese and and Written Opinion of the ISA (Japanese) for PCT/JP2012/080747, ISA/JP, mailed Jan. 29, 2013.

*Primary Examiner* — Thomas R. Hannon
(74) *Attorney, Agent, or Firm* — Harness, Dickey & Pierce, P.L.C.

(57) ABSTRACT

A crossed roller bearing, including: an inner element and an outer element that relatively rotate, the inner element including an annular inner V-groove that is provided along an outer peripheral surface of the inner element and that has a V shape that opens towards the outer element, the outer element including an annular outer V-groove that is provided along an inner peripheral surface of the outer element, that has a V shape that opens towards the inner element, and that faces the inner V-groove; a plurality of cylindrical rolling elements that are placed between the inner V-groove and the outer V-groove, that roll while being in contact with the inner V-groove and the outer V-groove, and adjacent rolling elements of which have rolling axes that are perpendicular to each other; and a retainer that are placed between the adjacent rolling elements that includes a flat section that is a projecting central section on an area which faces either one of the rolling elements and that is capable of contact with the rolling element, and a tilt section whose degree of projection becomes smaller as it goes from the flat section to an end section of the retainer.

7 Claims, 7 Drawing Sheets

(51) Int. Cl.
*F16C 33/37* (2006.01)
*F16C 33/66* (2006.01)

(56) References Cited

U.S. PATENT DOCUMENTS 4,795,277 A * 1/1989 Colanzi .................. 384/447
4,896,974 A * 1/1990 Shimizu .................. 384/47
8,408,803 B2 4/2013 Kunimoto et al.
2009/0297081 A1* 12/2009 Kunimoto et al. ............ 384/447

FOREIGN PATENT DOCUMENTS

JP H02-145318 U 12/1990
JP 2009-287587 A 12/2009

* cited by examiner

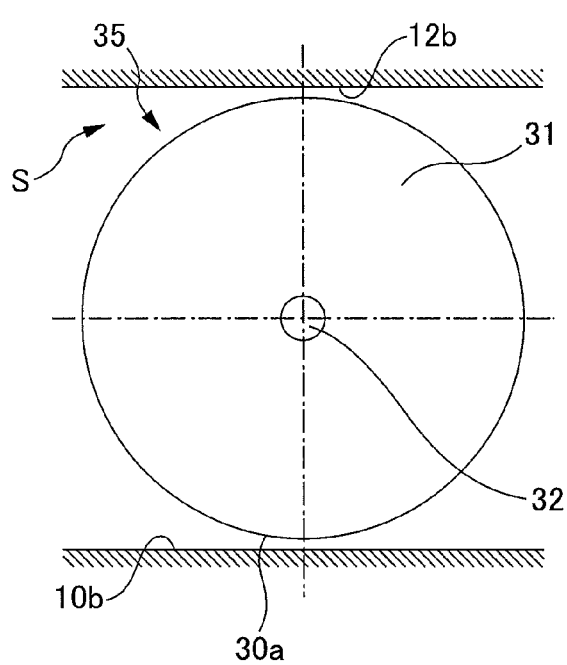
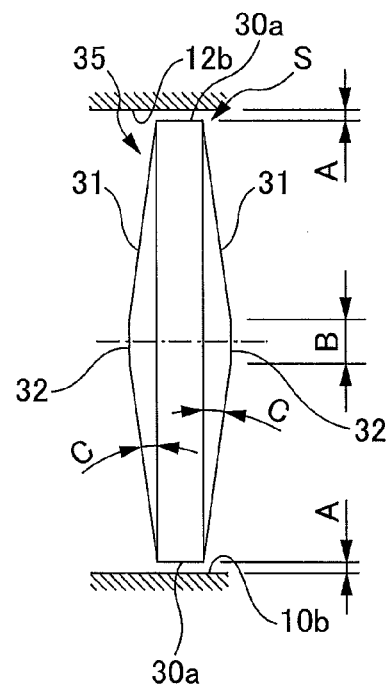
FIG. 9A          FIG. 9B
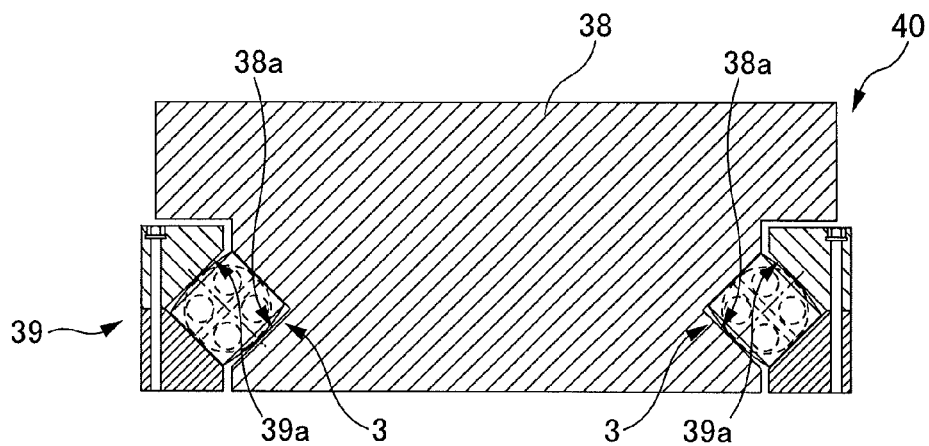
FIG. 10

CROSSED ROLLER BEARING

CROSS-REFERENCE TO RELATED APPLICATIONS

This application is a 371 U.S. National Stage of International Application No. PCT/JP2012/080747, filed Nov. 28, 2012, which claims priority to Japanese Patent Application No. 2011-264795, filed Dec. 2, 2011. The disclosures of the above applications are incorporated herein by reference.

TECHNICAL FIELD

The invention relates to a crossed roller bearing whose inner element and outer element relatively rotate.

BACKGROUND ART

As a crossed roller bearing in which an inner element and an outer element relatively rotate, the following slewing bearing is known: the slewing bearing includes multiple rollers and spacer retainers; the multiple rollers are placed between V-grooves facing each other so that the inclination directions in which adjacent rollers (rolling elements) are each inclined are alternately perpendicular to each other and so that the projected center lines of the rollers is directed towards the centers of inner and outer rings, the projected center lines being obtained by projecting the straight lines aligned with the axes of the rollers respectively onto the plane of rotation of inner and outer rings; and spacer retainers are placed between adjacent rollers in order to prevent skewing (shifting in a certain direction) of the rollers, each of the spacer retainers having concave grooves which the adjacent rollers rotatably fit. In the concave grooves, tilted contact surfaces are provided respectively for each of the rollers, each of the tilted contact surfaces having a vertex at the center in its longitudinal direction and tilts at half the angle between the projected center lines of the adjacent rollers (i.e., [PTL 1]).

CITATION LIST

Patent Literature

[PTL 1] Japanese Unexamined Utility Model Application Publication No. H1-156314

SUMMARY OF THE INVENTION

Technical Problem

In the conventional slewing bearing mentioned above, the tilted contact surfaces on which the spacer retainers fit the rollers are each a three-dimensional surface, which needs to be very particularly accurately machined. In addition, there is a possibility that spaces may exist depending on conditions of the position where each spacer retainer is placed. In this case, in order to eliminate such spaces, it is sometimes necessary to use multiple types of spacer retainers having three-dimensional surfaces each of which fits the spaces. In this type of slewing bearing, since it is complicated to assemble multiple rollers and multiple spacer retainers, there is a problem that increasing the types of the spacer retainers makes assembly operations more complicated.

The invention has been made in view of the above problems, and an advantage thereof is to provide a crossed roller bearing which is easy to be assembled and can prevent skewing of its rolling elements.

Solution to Problem

An aspect of the invention to achieve the above advantage is a crossed roller bearing, including:
an inner element and an outer element that relatively rotate,
the inner element including an annular inner V-groove
that is provided along an outer peripheral surface of the inner element and
that has a V shape that opens towards the outer element,
the outer element including an annular outer V-groove
that is provided along an inner peripheral surface of the outer element,
that has a V shape that opens towards the inner element, and
that faces the inner V-groove;
a plurality of cylindrical rolling elements
that are placed between the inner V-groove and the outer V-groove,
that roll while being in contact with the inner V-groove and the outer V-groove, and
adjacent rolling elements of which have rolling axes that are perpendicular to each other; and
a retainer
that are placed between the adjacent rolling elements
that includes
a flat section that is a projecting central section on an area which faces either one of the rolling elements and that is capable of contact with the rolling element, and
a tilt section whose degree of projection becomes smaller as it goes from the flat section to an end section of the retainer.

Other features of this invention will become apparent from the description in this specification and the attached drawings.

BRIEF DESCRIPTION OF THE DRAWINGS

FIG. 9 is a diagram showing a modified example of a retainer:
FIG. 9a is a view from a direction along the race space;
and FIG. 9b is a view from a direction intersecting the race space.
FIG. 10 is a cross-sectional view of a crossed roller bearing provided on a device.

MODE FOR CARRYING OUT THE INVENTION

Figure 1:
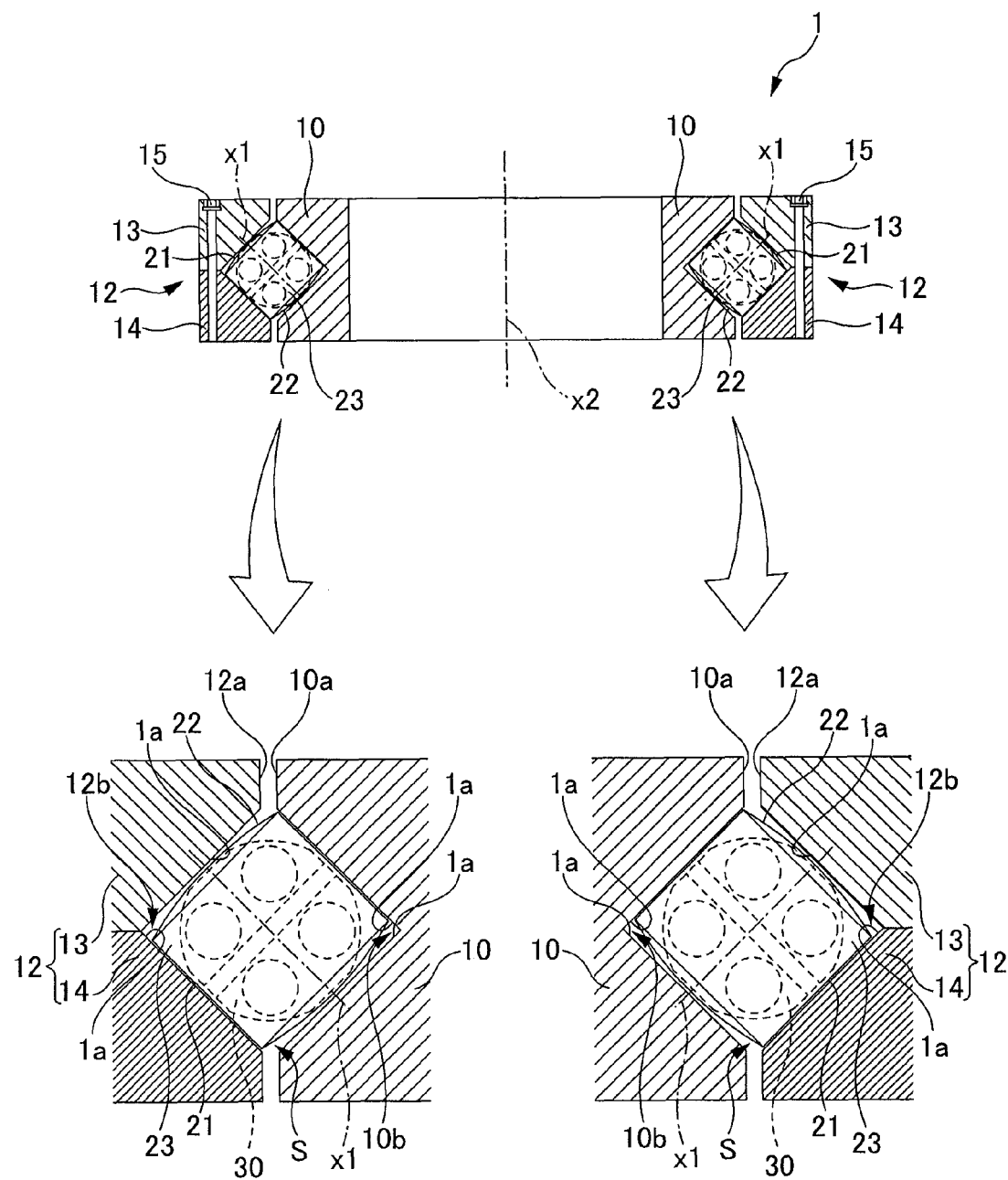
FIG. 1 is a cross-sectional view showing an example of a crossed roller bearing according to the invention.

From the description in the detailed description of the invention and the accompanied drawings, at least the following matters will be apparent.

A crossed roller bearing includes: an inner element and an outer element that relatively rotate, the inner element including an annular inner V-groove that is provided along an outer peripheral surface of the inner element and that has a V shape that opens towards the outer element, the outer element including an annular outer V-groove that is provided along an inner peripheral surface of the outer element, that has a V shape that opens towards the inner element, and that faces the inner V-groove; a plurality of cylindrical rolling elements that are placed between the inner V-groove and the outer V-groove, that roll while being in contact with the inner V-groove and the outer V-groove, and adjacent rolling elements of which have rolling axes that are perpendicular to each other; and a retainer that are placed between the adjacent rolling elements that includes a flat section that is a projecting central section on an area which faces either one of the rolling elements and that is capable of contact with the rolling element, and a tilt section whose degree of projection becomes smaller as it goes from the flat section to an end section of the retainer.

With such a crossed roller bearing, the plurality of cylindrical rolling elements are placed between the annular inner V-groove and the annular outer V-groove, and the retainer that is placed between the adjacent rolling elements of these rolling elements includes the flat section having the projecting central section capable of contact with the rolling element, on the area which faces either one of the rolling elements. This allows all the rolling elements and all the retainers to be in contact with each other at a substantially radially middle point in a space, the space being formed by the annular, inner V-groove and outer V-groove and being contact with the rolling elements when rolling. In this case, since the space in which the rolling elements are rolling while being in contact with the V-grooves has an annular shape, the distance between adjacent rolling elements is small on the side close to the center in the radial direction, and is large on the side away from the center. Therefore, if each retainer is flat, the retainer and the rolling element are in contact with each other at a position close to the center. This is likely to cause skewing of the rolling element towards the outer element. Therefore, the projecting central section, as in the retainer of the crossed roller bearing according to the invention, makes it possible to keep the appropriate distance between adjacent rolling elements while preventing skewing of the rolling elements.

Further, the retainer includes the tilt section whose degree of projection becomes smaller as it goes from the flat section located in the center to the end section. This makes it possible to prevent the sections except the flat section from coming into contact with the rolling elements.

Furthermore, since the surface of the retainer, where the retainer and the rolling element are in contact, is flat, the contact section with the cylindrical rolling element is linear. This makes it possible to provide a high resilient, crossed roller bearing which can further prevent abrasion of the retainer than when the retainer and the rolling element are in contact at a point.

In such a crossed roller bearing, it is desirable that the flat section has a strip-like shape and extends in a direction perpendicular to the rolling axis of the rolling element that the flat section faces.

With such a crossed roller bearing, since the flat section has a strip-like shape and extends in a direction perpendicular to the rolling axis, the position at which the flat section is in contact with the rolling element does not shift in a direction along the rolling axis even if the rolling element shifts in a direction intersecting the rolling axis. This makes it possible to keep the appropriate distance between adjacent rolling elements without exerting on the rolling element a force which causes skewing of the rolling element towards the outer element.

In such a crossed roller bearing, it is desirable that two flat sections are respectively provided in two areas facing the rolling elements between which the retainer is placed, and the two strip-like flat sections are perpendicular to each other.

With such a crossed roller bearing, since the rolling axes of adjacent rolling elements are perpendicular to each other, the strip-like flat sections can be respectively in contact with the adjacent rolling elements while the flat sections being perpendicular to each of rolling axes. This makes it possible to keep the appropriate distance between adjacent rolling elements without exerting any of the adjacent rolling elements a force which causes skewing.

In such a crossed roller bearing, it is desirable that the retainer is unrotatably provided.

With such a crossed roller bearing, since the retainer itself does not rotate, the position at which a rolling element adjacent to the retainer is in contact with the flat section of the retainer does not shift greatly. Also, relative orientation does not change greatly. This makes it possible to provide an efficient, crossed roller bearing which rotates more smoothly while keeping the flat section and the rolling element in proper contact with each other.

In such a crossed roller bearing,
the retainer may have a disk shape, and
the flat section may have a circular shape and be formed at the central section.

With such a crossed roller bearing, the flat sections of the retainer have a circular shape and are formed at the central section. So, the retainer can be arranged between the adjacent rolling elements regardless of its orientation with respect to the rolling axes. This makes it possible to keep the appropriate distance between adjacent rolling elements while preventing skewing of the rolling elements. In addition, a crossed roller bearing which is easy to be assembled can be provided.

In such a crossed roller bearing, it is desirable that grease fills between the inner V-groove and the outer V-groove, and the retainer includes a through hole on an area in which the flat section does not exist, the through hole extending through the retainer in a direction in which the flat section projects.

With such a crossed roller bearing, it is possible to cause grease filling between the inner V-groove and the outer V-groove to successfully circulate through the through holes when the rolling elements and the retainers move between the inner V-groove and the outer V-groove by the relative rotation of the inner element and the outer element of the crossed roller bearing. That is, it is possible to hold excess grease in the through holes while preventing the excess grease from remaining between the rolling element and the retainer. Further, providing through holes can reduce materials for manufacturing the retainer, which results in cost reduction.

In such a crossed roller bearing, it is desirable that the retainers the number of which is determined by a distance between the adjacent rolling elements are placed.

With such a crossed roller bearing, since retainers the number of which is determined by the distance between each pair of adjacent rolling elements are placed between the pair of adjacent rolling elements, it is possible to make spaces between each pair of adjacent rolling elements smaller. This makes it possible to provide a crossed roller bearing which rotates more smoothly.

A crossed roller bearing associated with an embodiment of the invention will be described below.

<<< Overview >>>

A common crossed roller bearing has the following configuration: the main elements are a plurality of rolling elements which each have a cylindrical shape or a roller-like shape and whose rolling axis is directional; and the plurality of rolling elements are arranged along the circumferential direction at certain intervals in an annular space between an inner element and an outer element which relatively rotate. The plurality of rolling elements roll, for example, between the inner race section of the inner element and the outer race section of the outer element. Particularly, in the crossed roller bearing, each rolling element is placed in an inclined manner so that its rolling axis is directed towards the rotational axis about which the inner element and the outer element rotate and so that the inclination direction of its rolling axis is perpendicular to the direction of the rolling axes of the adjacent rolling elements. Retainers are provided between the inner element and the outer element for holding the rolling elements which roll between the outer and inner elements.

The above configuration will be described according to the present embodiment. FIG. 1 is a cross-sectional view showing an example of a crossed roller bearing according to the invention.

A roller 23, which serves as a rolling element used in the crossed roller bearing 1 of the present embodiment, has a cylindrical shape and includes a cylindrical rolling surface 21 and a pair of curved end surfaces 22 on both ends of the rolling surface 21, the curved end surface 22 being convex outward. A plurality of the rollers 23 are circumferentially spaced in an annular space between an inner ring 10 and an outer ring 12; the inner ring 10 serves as the inner element, and the outer ring 12 is provided outside the inner ring 10 and serves as the outer element.

The plurality of rollers 23 roll between an inner V-groove 10b and an outer V-groove 12b: the inner V-groove 10b is an annular groove extending along the outer peripheral surface 10a of the inner ring 10 and has a V-shape with the point of the V extending towards the outer ring 12; and the outer V-groove 12b is an annular groove extending along the inner peripheral surface 12a of the outer ring 12, faces the inner V-groove 10b, and has a V-shape with the point of the V extending towards the inner ring 10.

The outer ring 12 is composed of a first ring element 13 and a second ring element 14 which each have a ringlike shape and are arranged facing each other in the rotation axial direction of the crossed roller bearing 1. The first ring element 13 and the second ring element 14 are integrated by fixing bolts 15.

On the inner-ring-10 side of the opposing surfaces of the first ring element 13 and the second ring element 14, a track surface 1a are provided along its circumferential direction. Each of the track surfaces 1a comes into contact with the rolling surface 21 of each roller 23, or faces the curved end surface 22 with a narrow spacing of 0.1 mm, for example; each roller 23 is placed in an inclined manner so as to be directed towards the rotation axis x2 of the crossed roller bearing 1. By integrating the first ring element 13 and the second ring element 14 with the fixing bolts 15, the track surface 1a of the first ring element 13 and the track surface 1a of the second ring element 14 are provided in the form of a V to form the outer V-groove 12b. The outer V-groove 12b guides the rolling of the rollers 23 from the outside.

Similarly, the inner peripheral surface 12a of the outer ring 12 faces the outer peripheral surface 10a of the inner ring 10, and the inner V-groove 10b is provided in the form of a V along its circumferential direction. The inner V-groove 10b comes into contact with the rolling surface 21 of each inclined roller 23, or faces the curved end surface 22 with a narrow spacing. Thus, the inner V-groove 10b guides the rolling of the rollers 23 from the inside.

Figure 2:
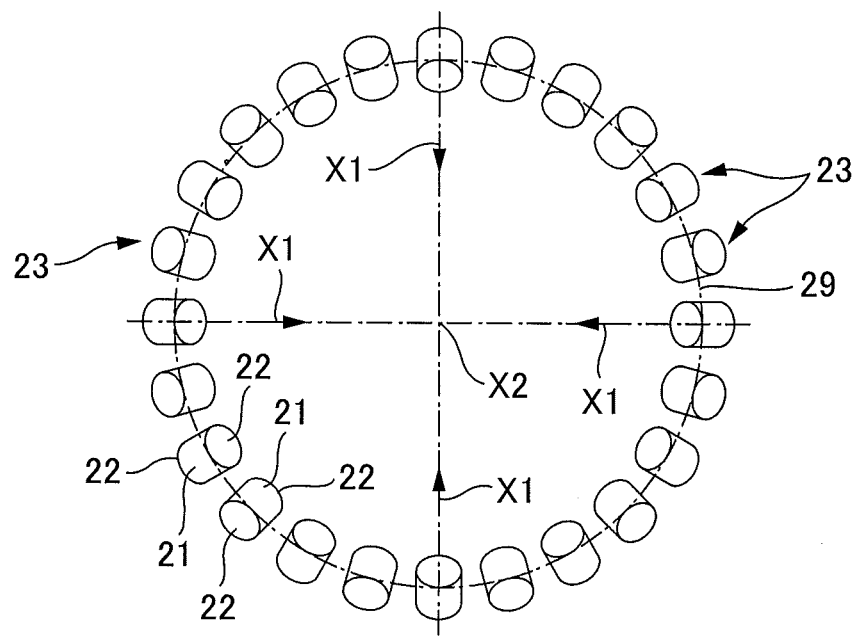
FIG. 2 is a conceptual diagram showing rollers provided in the crossed roller bearing of the present embodiment.
Figure 3:
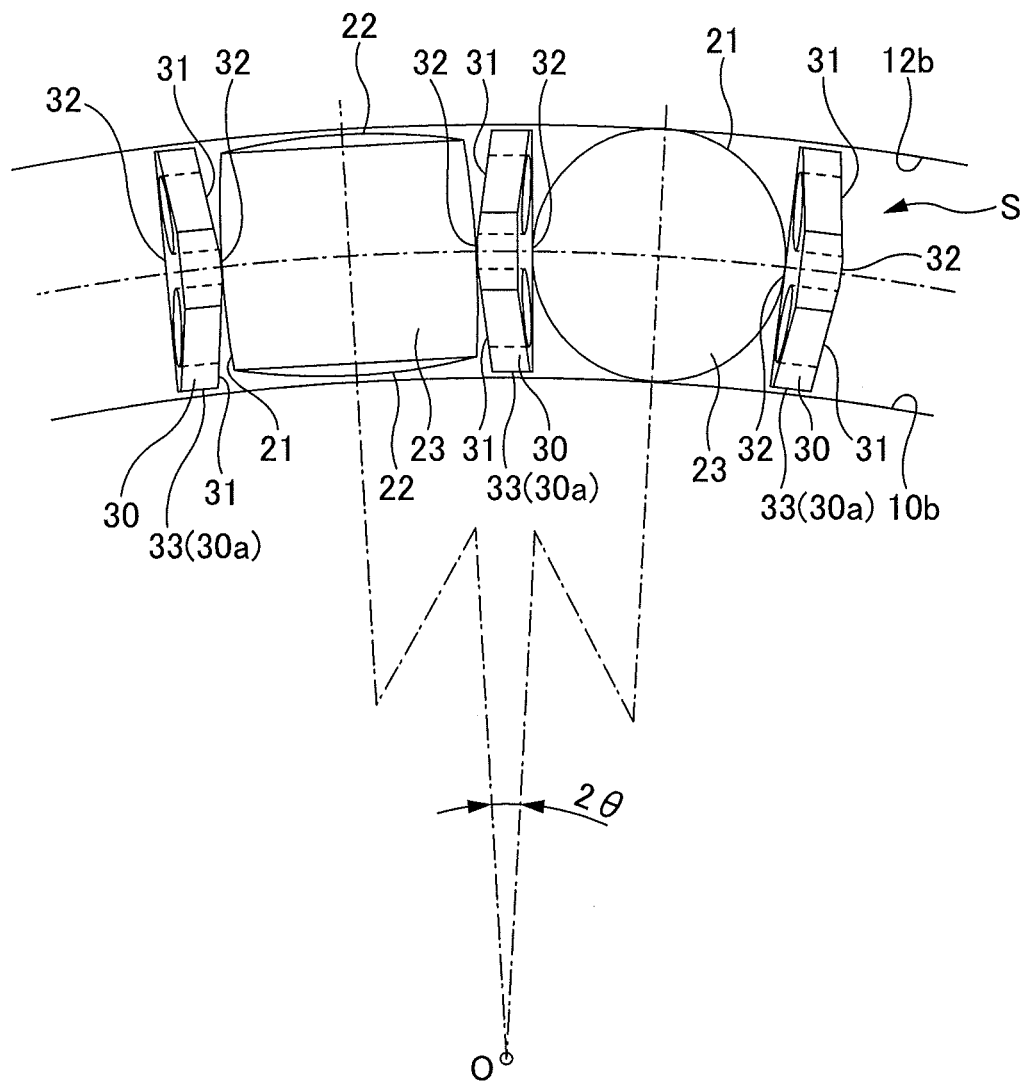
FIG. 3 is a diagram showing how rollers and retainers are provided in a race space.

FIG. 2 is a conceptual diagram showing rollers provided in the crossed roller bearing of the present embodiment. FIG. 3 is a diagram showing how rollers and retainers are provided in a race space.

The rollers 23 are placed between the inner V-groove 10b and the outer V-groove 12b in an inclined manner so that the rolling axes x1 of the rollers 23 are directed towards the rotation axis x2 of the inner ring 10 and so that the inclination direction of the rolling axes x1 of adjacent rollers 23 are perpendicular to each other as shown in FIG. 2. A retainer 30 is placed between each pair of adjacent rollers 23, as omitted in FIG. 2 but shown in FIG. 3. Further, grease (not shown) fills between the inner V-groove 10b and the outer V-groove 12b.

Figure 4:
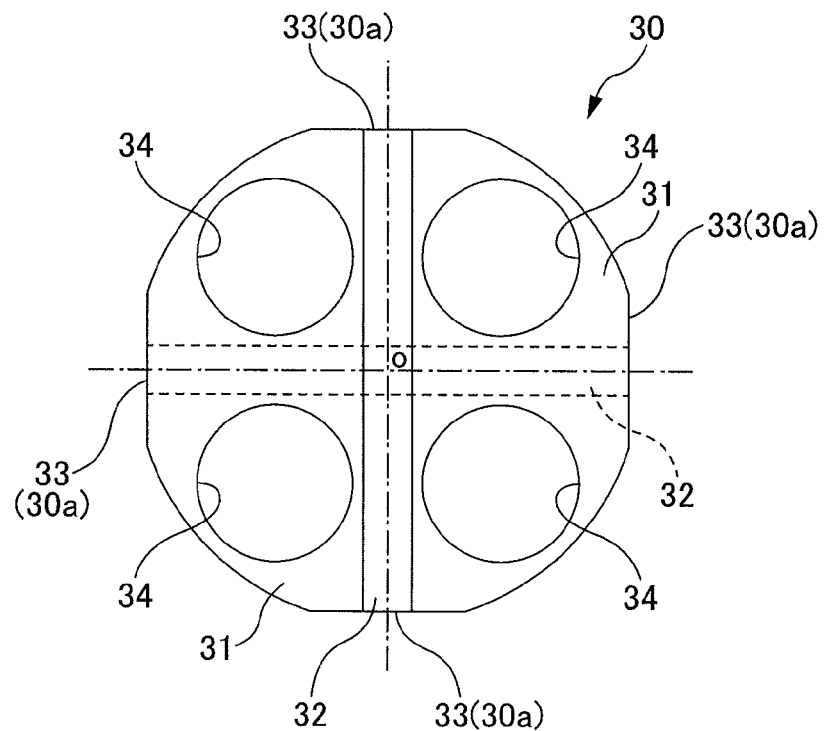
FIG. 4 is a diagram showing the retainer as viewed from a direction along the race space.
Figure 5:
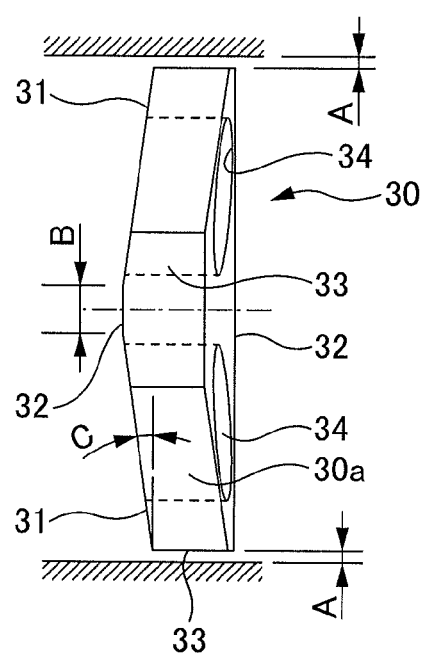
FIG. 5 is a diagram showing the retainer as viewed from a direction intersecting the race space.

FIG. 4 is a diagram showing the retainer as viewed from a direction along the race space. FIG. 5 is a diagram showing the retainer as viewed from a direction intersecting the race space.

The retainer 30 is a member made of resin having substantially a disk shape. As shown in FIGS. 4 and 5, on the outer periphery of the retainer 30, there are formed pairs of peripheral parallel surfaces 33 extending in parallel in two directions which are perpendicular to each other through the center o of the retainer 30. That is, the retainer 30 has a shape in which four arcs are removed from the disk-shaped outer periphery.

Figure 6:
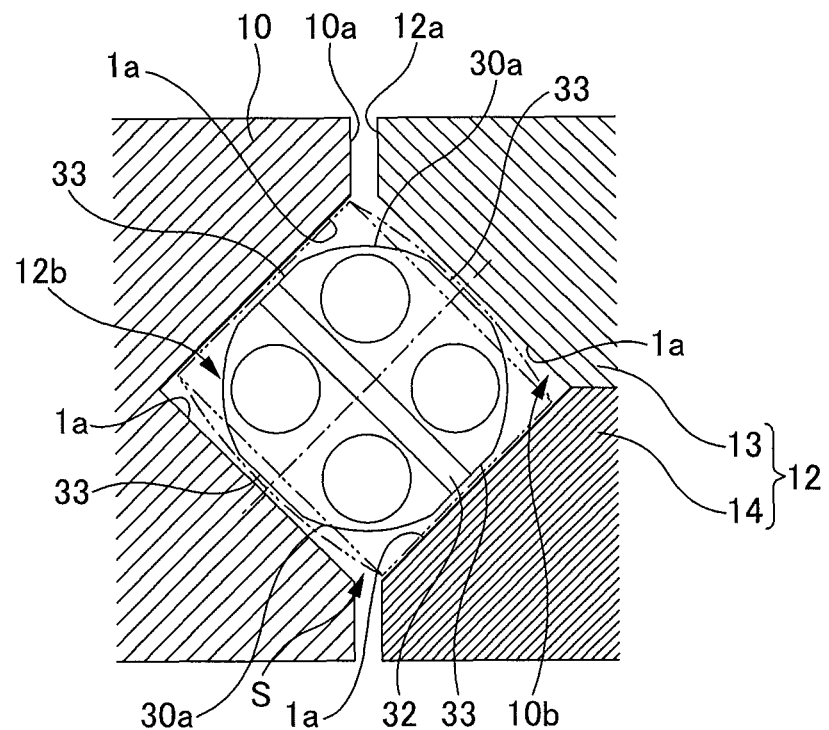
FIG. 6 is a diagram showing the retainer placed in the race space.

FIG. 6 is a diagram showing a retainer placed in the race space.

In the race space S whose longitudinal cross-section is substantially rectangular and which is formed by the inner V-groove 10b and the outer V-groove 12b, when the retainers 30 is placed between a pair of adjacent rollers 23, the four peripheral parallel surfaces 33 of each retainer 30 respectively face four track surfaces 1a in the race space S with a narrow space (e.g., 0.1 mm), as shown in FIG. 6.

In the central section on both surfaces of the retainer 30, a strip-like flat section 32 is provided extending along the straight line passing the center o and extending across one of two pairs of the peripheral parallel surfaces 33 on the outer periphery. The flat sections 32 extend in different directions depending on the surfaces of the retainer 30; the direction of the flat section 32 on one surface is perpendicular to the direction of the flat section 32 on the other surface. Also, the retainer 30 has tilt sections 31 which are tilted from the flat sections 32 towards the end sections 30a so that the retainer 30 becomes thinner. That is, the flat sections 32 provided on the central section of the retainer 30 are projected outward, and the tilt section 31 is tilted, which the degree of projection becomes smaller as it goes from the flat sections 32 to the end sections 30a. In this case, the width B of the flat section 32 is greater than or equal to 2A, that is, the total (the two places) of the distance A from the peripheral parallel surface 33 of the retainer 30 to the track surface 1a of the inner ring 10 or the outer ring 12. Further, the tilt sections 31 extend from the flat section 32 to the end section 30a of the retainer 30 as mentioned above, and the tilt angle C thereof is larger than the angle θ, half the angle 2θ between straight lines from the center O of the crossed roller bearing 1 to the rolling axes x1 of the adjacent rollers 23 between which the retainer 30 is placed, as shown in FIG. 3.

Further, on the tilt section 31 of the retainer 30, that is, on areas in which the flat sections 32 do not exist, holes 34 are provided as through holes extending through the retainer 30 in a direction in which the flat sections 32 are projected. Each of these holes 34 serves as a flow path through which grease filling the race space S moves when the rollers 23 and the retainers 30 move in the race space S by the relative rotation of the inner ring 10 and the outer ring 12 of the crossed roller bearing 1. In addition, the hole 34 has a function to hold excess grease.

The retainer 30 which is placed between a pair of adjacent rollers 23 is arranged so that the rolling axis x1 of each roller 23 facing one of the flat sections 32 of the retainer 30 is respectively perpendicular to the direction in which the strip-like flat section 32 extends. In this case, the adjacent rollers 23 are arranged so that their rolling axes x1 are perpendicular to each other. In addition, the flat section 32 on one surface of the retainer 30 is perpendicular to the flat section 32 on the other surface. Therefore, if the number of the rollers 23 included in the crossed roller bearing 1 is even, the retainer 30 is arranged so that a direction in which each flat section 32 extends on each surface of the retainer 30 is perpendicular to the rolling axis x1 of each roller 23.

Figure 7:
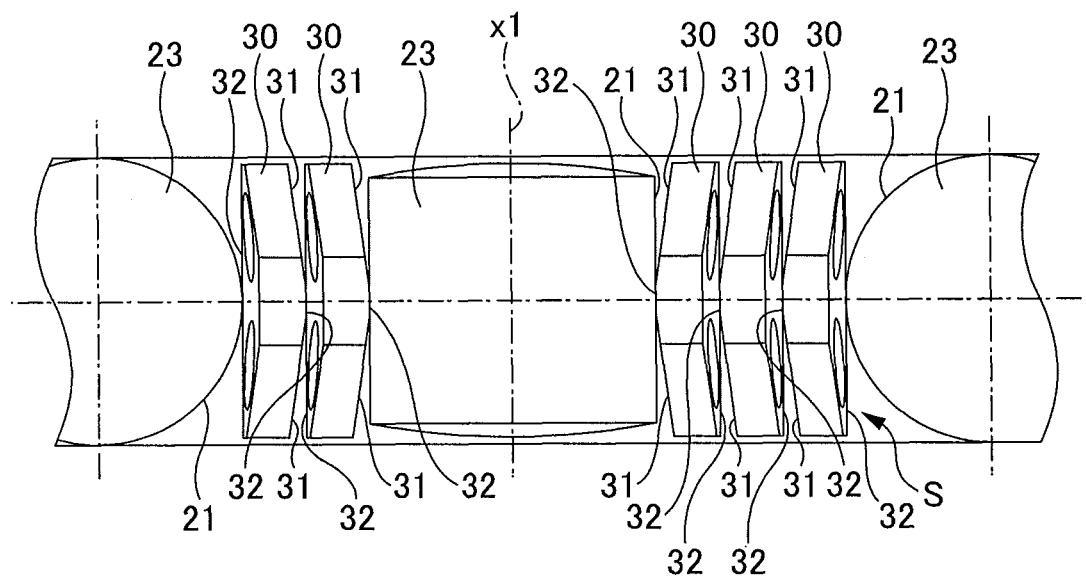
FIG. 7 is a diagram illustrating additional retainers provided in an empty space between a retainer and a roller.
Figure 8:
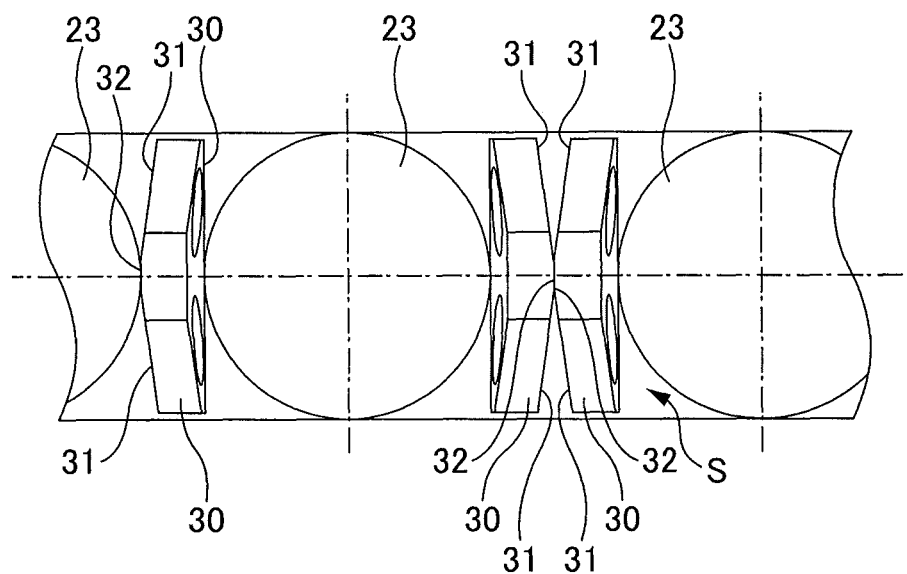
FIG. 8 is a diagram of a retainer when the rolling axes of the rollers adjacent to the retainer point in the same direction.

FIG. 7 is a diagram illustrating additional retainers provided in an empty space between a retainer and a roller. FIG. 8 is a diagram of a retainer when the rolling axes of the rollers adjacent to the retainer point in the same direction.

When the rollers 23 and the retainers 30 are alternately arranged in the race space S, if an empty space is large between a certain retainer 30 and a certain roller 23, it is desirable that an additional retainer 30 pointing in the same direction as the certain retainer 30 is arranged in the empty space, as shown in FIG. 7.

If the number of the rollers 23 included in the crossed roller bearing 1 is odd, the rolling axes x1 of any one of pair of adjacent rollers 23 are in the same direction. So, as shown in FIG. 8, an additional retainer 30 is placed between the retainer 30 and the roller 23 so that flat sections 32 of both retainers 30 extending in the same direction faces.

In the crossed roller bearing 1 of the present embodiment, there are a plurality of cylindrical rollers 23 between the inner V-groove 10b and the outer V-groove 12b, both of the inner V-groove 10b and the outer V-groove 12b having an annular shape. The retainer 30 is placed between adjacent ones of the plurality of the rollers 23, and includes flat sections 32; each flat section 32 is a projecting central section on an area which faces either of the adjacent rollers 23 and the central section can be in contact with the roller 23. This allows all the rollers 23 and all the retainers 30 to be in contact with each other at a substantially radially middle point in the race space S, the race space S being formed by the annular, inner V-groove 10b and outer V-groove 12b and being contact with the rollers 23 when rolling. In this case, since the race space S in which the rollers 23 are rolling while being in contact with the V-grooves has an annular shape, the distance between adjacent rollers 23 is small on the side close to the center O in the radial direction, and is large on the side away from the center. Therefore, if each retainer 30 is flat, the retainer 30 and the roller 23 are in contact with each other at a position close to the center. This is likely to cause skewing of the roller 23 towards the outer ring 12. Therefore, the projecting central section, as in the retainer 30 of the crossed roller bearing 1 according to the invention, makes it possible to keep the appropriate distance between adjacent rollers 23 while preventing skewing of the rollers 23.

Further, the retainer 30 includes the tilt section 31 whose degree of projection becomes smaller as it goes from the flat section 32 located in the center to the end section 30a. This makes it possible to prevent the sections except the flat section 32 from coming into contact with the rollers 23.

Furthermore, since the flat section 32 of the retainer 30, where the retainer 30 and the roller 23 are in contact, is flat, the contact section with the cylindrical roller 23 is linear. This makes it possible to provide a high resilient, crossed roller bearing 1 which can prevent abrasion of the retainer 30 than when the retainer 30 and the roller 23 are in contact at a point.

Since each flat section 32 has a strip-like shape and extends in a direction perpendicular to the rolling axis, the position at which the flat section 32 is in contact with the roller 23 does not shift in a direction along the rolling axis even if the roller 23 shifts in a direction intersecting the rolling axis. This makes it possible to keep the appropriate distance between adjacent rollers 23 without exerting on the roller 23 a force which causes skewing of the roller 23 towards the outer ring 12.

Since the rolling axes x1 of adjacent rollers 23 are perpendicular to each other, the strip-like flat sections 32 can be respectively in contact with the adjacent rollers 23 while the flat sections 32 being perpendicular to each of the rolling axes x1. This makes it possible to keep the appropriate distance between adjacent rollers 23 without exerting any of the adjacent rollers 23 a force which causes skewing.

Since the peripheral parallel surface 33 of the retainer 30 faces with a narrow spacing the track surface 1a which forms the race space S, the retainers 30 cannot rotate. That is, since the retainer 30 itself does not rotate, the position at which a roller 23 adjacent to the retainer 30 is in contact with the strip-like flat section 32 of the retainer 30 does not shift greatly. Also, relative orientation does not change greatly. This makes it possible to provide an efficient, crossed roller bearing 1 which rotates more smoothly while keeping the retainers 30 and the rollers 23 in proper contact with each other. Further, since the retainer 30 cannot rotate, there is less friction between the inner V-groove 10b and the outer V-groove 12b, so that unnecessary load is not generated. This makes it possible to provide a more efficient, crossed roller bearing 1.

Since each retainer 30 has holes 34, grease filling the race space S can circulate through these holes 34 when the rollers 23 and the retainers 30 move in the race space S by the relative rotation of the inner ring 10 and the outer ring 12 of the crossed roller bearing 1.

More specifically, if the retainers have no hole, when the retainers move in the race space S, most of grease filling in the race space S gathers and remains in the four corners of the race space S in such a manner that the grease is pushed by projecting flat sections and tilt surfaces, which form both surface of each retainer. Simultaneously, since grease in the race space S is replenished in excess, the retainers always push grease when moving. Therefore, it is possible that frictional torque during rotation is increased by grease-derived pressure and becomes load. In addition, it is possible that abnormal sound is generated because of rubbing sound caused by high-speed movement of the retainers and grease.

If each retainer has a projecting center part and does not include holes as in the above embodiment, grease is less likely to remain on the projecting flat section of the retainer. So, it is difficult to hold grease in the vicinity of a section contacting with the roller. Providing holes 34 on each retainer 30 as in the above embodiment enables these holes 34 to serve as escape places for grease during the rotation of the crossed roller bearing 1. This makes it possible to reduce load caused by the grease during the rotating. Also, since the holes 34 can hold a large amount of grease, excess grease in the race space S can be kept in the holes 34, and it is possible to hold grease in the vicinity of the flat section 32 which is in contact with the roller 23. This makes it possible to maintain more desirable contact between the roller 23 and the retainer 30.

Providing holes 34 can reduce materials for manufacturing the retainers 30, which results in cost reduction.

Further, since the retainers 30 the number of which is determined by the distance between each pair of adjacent rollers 23 are placed between the pair of rollers, the space between each pair of the adjacent rollers 23 can be reduced. This makes it possible to provide a crossed roller bearing 1 which rotate more smoothly.

=== Other Embodiments ===

The above embodiment is for facilitating understanding of the invention and is not intended to limit the interpretation of the invention. The invention can of course be altered and improved without departing from the gist thereof, and equivalents are intended to be embraced therein. Particularly, the following embodiments are also included in the invention.

FIG. 9 is a diagram showing a modified example of a retainer: FIG. 9a is a view from the direction along the race space; and FIG. 9b is a view from the direction intersecting the race space.

The embodiment mentioned above provides the example of a crossed roller bearing 1 in which the retainers 30 include the peripheral parallel surfaces 33 and the strip-like flat sections 32 and the retainers 30 cannot rotate. However, as shown in FIG. 9, a retainer 35 may have a disk shape and may include circular flat sections 32 at the center. In this case, since the flat sections 32 of the retainer 35 has a circular shape and is formed at the central section, the retainer 35 can be arranged between the adjacent rollers 23 regardless of its orientation with respect to the rolling axes x1. This makes it possible to keep the appropriate space between adjacent rollers 23 while preventing skewing of the rollers 23. In addition, a crossed roller bearing 1 which is easy to be assembled can be provided.

FIG. 10 is a cross-sectional view of a crossed roller bearing provided on a device.

In the embodiment mentioned above, the crossed roller bearing 1 including the inner ring 10 and the outer ring 12 is described. However, the invention is not limited thereto. For example, as shown in FIG. 10, the following crossed roller bearing 3 directly provided on a device 40 is also acceptable: a rotational element 38 which rotates is provided instead of the inner ring; an inner V-groove 38a is provided directly on the outer peripheral surface of the rotational element 38; a support member 39 which supports the rotational element 38 is included instead of the outer ring 12; and an outer V-groove 39a is provided on the support member 39.

In the embodiment mentioned above, the example in which the outer ring 12 and the support member 39 are separated is described. However, the configuration in which the inner ring 10 and the rotational element 38 are separated is also acceptable.

Further, in the embodiment mentioned above, the crossed roller bearing 1 including the annular race space S which rotates is described. However, the invention is not limited thereto. For example, this invention may be applied a linear guide which uses a linear crossed roller including a straight race space S.

REFERENCE SIGNS LIST

1 crossed roller bearing, 1a track surface,
3 crossed roller bearing, 10 inner ring, 10a outer peripheral surface,
10b inner V-groove, 12 outer ring, 12a inner peripheral surface,
12b outer V-groove, 13 first ring element,
14 second ring element, 15 fixing bolt, 21 rolling surface,
22 curved end surface, 23 roller, 30 retainer, 30a end sections of retainer, 31 tilt section, 32 flat section, 33 peripheral parallel surface, 34 hole, 35 retainer, 36 flat section, 37 narrow groove, 38 rotational element, 38a inner V-groove, 39 support member, 39a outer V-groove, 40 device, x1 rolling axis, x2 rotation axis, A distance between peripheral parallel surface and track surface, B width of flat section, C tilt angle, O center of rotation, o center of retainer, S race space

The invention claimed is:

1. A crossed roller bearing, comprising:
an inner element and an outer element that relatively rotate,
the inner element including an annular inner V-groove
that is provided along an outer peripheral surface of the inner element and
that has a V shape that opens towards the outer element,
the outer element including an annular outer V-groove
that is provided along an inner peripheral surface of the outer element,
that has a V shape that opens towards the inner element, and
that faces the inner V-groove;
a plurality of cylindrical rolling elements
that are placed between the inner V-groove and the outer V-groove,
that roll while being in contact with the inner V-groove and the outer V-groove, and
adjacent rolling elements of which have rolling axes that are perpendicular to each other; and
a plurality of retainers
that are placed between the adjacent rolling elements, that include
a flat section that is a projecting central section on an area which faces either one of the rolling elements and that is capable of contact with the rolling element, and
a tilt section whose degree of projection becomes smaller as it goes from the flat section to an end section of the retainers.

2. A crossed roller bearing according to claim 1, wherein the flat section has a strip-like shape and extends in a direction perpendicular to the rolling axis of the rolling element that the flat section faces.

3. A crossed roller bearing according to claim 2, wherein two strip-like flat sections are respectively provided in two areas facing the rolling elements between which the retainer is placed, and
the two strip-like flat sections are perpendicular to each other.

4. A crossed roller bearing according to claim 1, wherein the retainers are unrotatably provided.

5. A crossed roller bearing according to claim 1, wherein the retainers have a disk shape, and
the flat section has a circular shape and is formed at the central section.

6. A crossed roller bearing according to claim 1, wherein grease fills between the inner V-groove and the outer V-groove, and the retainers include a through hole on an area in which the flat section does not exist, the through hole extending through the retainer in a direction in which the flat section projects.

7. A crossed roller bearing according to claim 1, wherein a number of the retainers placed between the adjacent rolling elements is determined by a distance between the adjacent rolling elements.

\* \* \* \* \*